(12) United States Patent
Phillips

(10) Patent No.: US 11,449,153 B1
(45) Date of Patent: Sep. 20, 2022

(54) COMPUTER PERIPHERAL DEVICES AND METHODS OF USING THE SAME

(71) Applicant: Muted LLC, Charlotte, VT (US)

(72) Inventor: Crawford Phillips, Charlotte, VT (US)

(73) Assignee: Muted LLC, Charlotte, VT (US)

( * ) Notice: Subject to any disclaimer, the term of this patent is extended or adjusted under 35 U.S.C. 154(b) by 0 days.

(21) Appl. No.: 17/726,132

(22) Filed: Apr. 21, 2022

(51) Int. Cl.
| | |
|---|---|
| *G06F 3/02* | (2006.01) |
| *G06F 3/16* | (2006.01) |
| *H04N 5/232* | (2006.01) |
| *G06F 3/023* | (2006.01) |
| *G08B 5/22* | (2006.01) |

(52) U.S. Cl.
CPC .......... *G06F 3/0238* (2013.01); *G06F 3/0202* (2013.01); *G06F 3/165* (2013.01); *G08B 5/22* (2013.01); *H04N 5/23203* (2013.01)

(58) Field of Classification Search
CPC ...... G06F 3/0238; G06F 3/0202; G06F 3/165; G06F 3/0219; H04N 5/23203; H04N 5/232; H01H 13/023; H01H 13/14; H01H 9/182; H01H 9/161; H01H 9/062; H01H 9/025; H01H 2219/0622; H01H 2219/036; H01H 23/025; H01H 3/12; G08B 5/22
See application file for complete search history.

(56) References Cited

U.S. PATENT DOCUMENTS

| | | | |
|---|---|---|---|
| 10,256,057 B2* | 4/2019 | Clementson | H01H 13/14 |
| 2007/0062794 A1* | 3/2007 | Rainer | H01H 13/023 |
| | | | 200/314 |
| 2010/0007517 A1* | 1/2010 | Andrews | H04B 1/202 |
| | | | 340/12.54 |
| 2015/0244336 A1* | 8/2015 | Desmarais | H03G 1/02 |
| | | | 381/105 |
| 2017/0353168 A1* | 12/2017 | Snyder | G01D 5/3473 |
| 2021/0306761 A1* | 9/2021 | Foletta | H04R 19/005 |

FOREIGN PATENT DOCUMENTS

EP       2339602 A1 *  6/2011    ........... H01H 13/023

OTHER PUBLICATIONS

About MuteMe. Mission, Vision and Values. https://muteme.com/pages/about (Last viewed on Apr. 20, 2022).
MuteSync. A Mute Button That Also Shows Everyone When Your Mic Is Live, https://mutesync.com/ (Last viewed on Apr. 20, 2022).

(Continued)

*Primary Examiner* — Xuemei Zheng
(74) *Attorney, Agent, or Firm* — Downs Rachlin Martin PLLC

(57) ABSTRACT

Computer peripheral devices designed and configured to generate and send peripheral device command signals for controlling software applications. In some examples the peripheral device command signals are designed to be the same as command signals generated by a keyboard in response to pressing one or more keyboard keys corresponding to a keyboard shortcut for a software application control function. The peripheral devices may be selectively configured into one of a plurality of configurations for selectively generating peripheral device command signals by selecting a position of at least one command signal group selector switch operably coupled to the peripheral device.

27 Claims, 5 Drawing Sheets

(56) References Cited

OTHER PUBLICATIONS

Luxafor Mute Button, https://luxaror.com/luxafor-microphone-mute-button/ (Last viewed on Apr. 20, 2022).

Making a Zoom Panic Switch with the Adafruit Trinket M0 | simonprickett.dev. https://simonprickett.dev/making-a-single-button-keyboard/ (Last viewed on Apr. 20, 2022).

Let's get on board: how to make a one-button USB keyboard—CRAFT (centric.eu). https://craft.centric.eu/blog/net/lets-get-on-board-how-to-make-a-one-button-usb-keyboard/?msclkid=08b48a40c0f511ecacf5f20ef589b2b6 (Last viewed on Apr. 20, 2022).

"Making USB Push Buttons" by Tommy O'Mahony, https://timmyomahony.com/blog/making-usb-push-buttons (May 11, 2016).

Arduino USB HID Keyboard—MitchTech | MitchTech. https://mitchtech.net/arduino-usb-hid-keyboard/ (Last viewed on Apr. 21, 2022).

Amazon.com: Programmable Macro PC Keyboard User-Defined USB Button Single Keyboard Switch OSU Keypad Same Customized Shortcut Combination Key 1 Key to Enter Password : Electronics. https://www.amazon.com/Programmable-User-Defined-Button-Customized-Combination/dp/B08SQGWZN4?th=1 (Last viewed on Apr. 21, 2022).

\* cited by examiner

COMPUTER PERIPHERAL DEVICES AND METHODS OF USING THE SAME

FIELD OF THE DISCLOSURE

The present disclosure generally relates to the field of computer peripheral devices. In particular, the present disclosure is directed to computer peripheral devices designed to be selectively configured into one of a plurality of configurations for selectively generating peripheral device command signals.

BACKGROUND

Modern video conferencing software typically has a set of two commonly used controls, the video on/off control and the microphone on/off control, the latter also referred to as the mute control. Users often need to use the mute control during a call, especially during calls with more than two people. The user can either select a control button of a graphical user interface (GUI) or use a keyboard shortcut. The keyboard shortcut is typically a combination of two or more keyboard keys that must be quickly located and then depressed at the same time. Utilizing either the GUI or keyboard shortcut in the moment can be challenging even for experienced users. A related issue is an uncertainty of mute status. The software's onscreen status indicator is often difficult to locate, resulting in users being muted when they want to talk and inadvertently talking on the call when they thought they were on mute.

SUMMARY OF THE DISCLOSURE

In one implementation, the present disclosure is directed to a computer peripheral device. The computer peripheral device includes a housing that includes a sidewall having a top end, wherein the housing defines an interior volume and an opening at the top end; a microcontroller disposed in the interior volume; at least one light emitting element disposed in the interior volume; an actuator slidably disposed in the opening, the actuator having top and bottom surfaces and an outer side; and a bushing disposed between the sidewall and the actuator, the bushing having opposed top and bottom sides and an inner side, wherein the inner side is in sliding contact with the outer side of the actuator and provides a bearing surface for the actuator, wherein the bushing is designed and configured as a light guide that receives light incident at the bottom side emitted from the at least one light emitting element and uniformly emits the light along the top side of the bushing; wherein the microcontroller is configured to transmit at least one peripheral device command signal in response to a user activation of the actuator.

In another implementation, the present disclosure is directed to a computer peripheral device. The computer peripheral device includes a microcontroller; an actuator coupled to the microcontroller; and at least one command signal group selector switch coupled to the microcontroller; wherein, in response to a user activation of the actuator, the microcontroller is configured to: send a first group of peripheral device command signals in response to a user-selected configuration of the at least one command signal group selector switch being in a first one of a plurality of configurations; and send a second group of peripheral device command signals in response to a user-selected configuration of the at least one command signal group selector switch being in a second one of the plurality of configurations.

In yet another implementation, the present disclosure is directed to a method of controlling a computer program with a computer peripheral device. The method includes in response to a user activation of an actuator of the peripheral device; sending a first group of peripheral device command signals in response to a user-selected configuration of at least one command signal group selector switch of the peripheral device being in a first one of a plurality of configurations; and sending a second group of peripheral device command signals in response to a user-selected configuration of the at least one command signal group selector switch being in a second one of the plurality of configurations.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Aspects of the present disclosure include computer peripheral devices that are designed and configured to generate and send peripheral device command signals for controlling a software application. In some examples the peripheral device command signals are designed to be the same as command signals generated by a keyboard in response to pressing one or more keyboard keys corresponding to a keyboard shortcut for a software application control function. In some examples, devices of the present disclosure provide the benefits of simplicity and ease of use because the devices send commands according to a standardized peripheral device command protocol, such as the HID command protocol. As such, the device can be plugged in or otherwise placed in communication with a computer and be immediately operable without the need to download any third party software. In some examples, devices of the present disclosure also provide versatility by being configured to be operable with a range of operating systems, including Microsoft Windows, Apple Inc. macOS, Android OS and/or Chrome OS, among others. The peripheral devices may be selectively configured into one of a plurality of configurations for selectively generating peripheral device command signals. In an example a selected configuration may be achieved by selecting a position of at least one command signal group selector switch operably coupled to the peripheral device.

Figure 1:
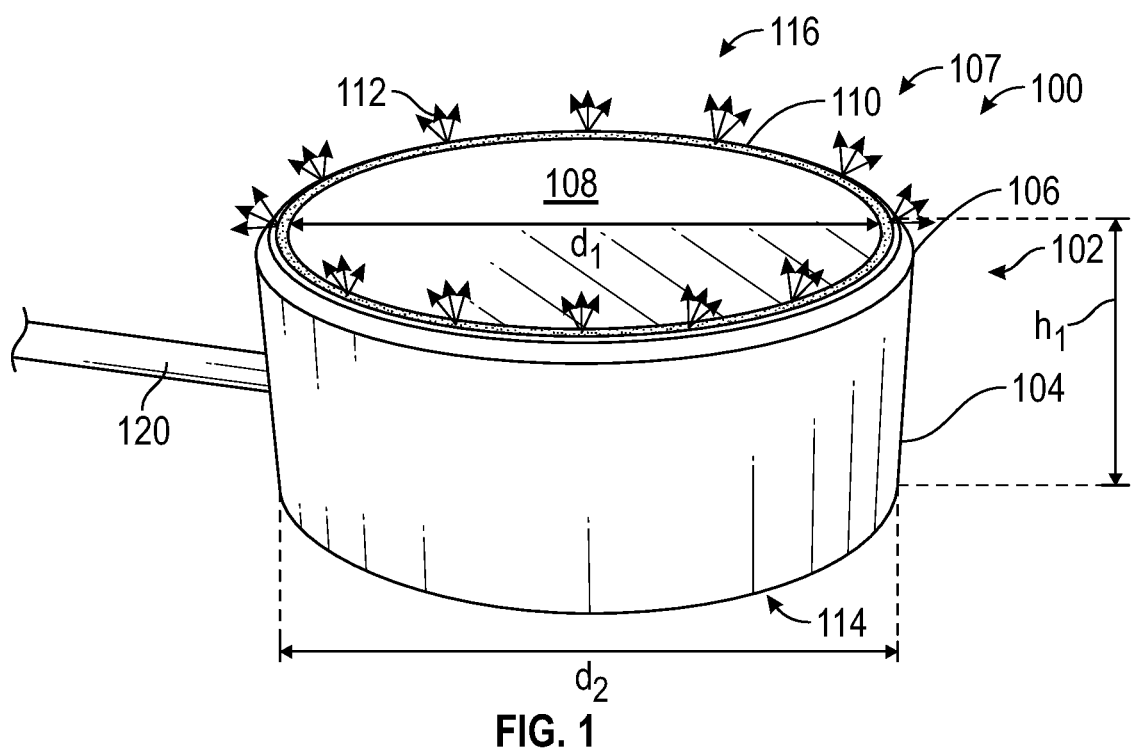
FIG. 1 is a perspective view of one example of a peripheral device made in accordance with the present disclosure in the form of a pushbutton.

FIG. 1 shows one example implementation of a computer peripheral device in the form of a pushbutton 100 made in accordance with the present disclosure. In the illustrated example, pushbutton 100 includes a housing 102 that includes a sidewall 104, the sidewall having a top end 106 that defines an opening 107, and an actuator 108 slidably disposed in the opening. Pushbutton 100 also includes a light guide 110 that extends around a periphery of the pushbutton. Light guide 110 is configured to emit light generated by one or more light emitting elements located in an interior of the housing and uniformly emit the light along the length of the light guide. In some examples, pushbutton 100 is configured to emit a control status light signal 112 via light guide 110 to provide a light signal indicating a status of one or more controls, such as a mute status light signal that provides a conspicuous indication of whether a microphone of a computing device connected to pushbutton 100 is muted. Pushbutton 100 includes a bottom side 114 and an opposite top side 116, the actuator located on the top side and the bottom side designed to rest on a surface such as a table surface. Pushbutton 100 also includes a cable 120 for connecting to a computer, such as a USB cable or any other type of connector known in the art. In other examples pushbutton 100 may be wireless and configured to connect to a computer via Bluetooth or another wireless communication protocol.

Pushbutton 100 may be configured to send, via cable 120, at least one peripheral device command signal, such as a mute on/off signal, in response to actuator 108 being pressed. In some examples, a state of control status light signal 112 may also change in response to actuator 108 being pressed, such as a color of light 112 changing from red to green (or between any two colors) or turning on or off to provide a large, conspicuous and clear indicator to the user of a status of a control, such as whether the user is muted or not. Pushbutton 100, therefore, provides extreme simplicity and ease of use—the user simply needs to press the oversized actuator 108 to quickly and easily mute and unmute him or herself and merely needs to glance at light guide 110 to know whether he or she is on mute.

In the illustrated example, pushbutton 100 includes only one actuator 108 to facilitate the simplicity of the design. In other examples, peripheral devices made in accordance with the present disclosure may include two or more actuators. In the illustrated example actuator 108 extends across a majority of the top side 116 of the pushbutton and is configured to be actuated when a user presses on any location on the actuator to facilitate ease of use so that a user can quickly and easily hit the actuator in the moment. In an example, a dimension, d1, of an outer extent of actuator 108, here a diameter of the actuator, is substantially the same as a dimension, d2, of an outer extent, here a diameter, of pushbutton 100. For example, d1 may be in the range of 80% to 99% of d2, and in some examples, in the range of 85% to 99% of d2, and in some examples, 90% to 99% of d2, and in some examples, 95% to 99% of d2. The dimensions of pushbutton 100 can vary according to a particular use case. For example, pushbutton 100 may be designed to be located on a user's desk and be relatively oversized and in those cases dimension d2 may be in the range of about 3" to about 6" and a height, h1, of the pushbutton may be in the range of about 1" to about 6". In other examples, pushbutton 100 may be smaller or larger. For example, pushbutton may be miniaturized and could include attachment features for attaching the pushbutton to another object, such as a clip or magnet for attaching the pushbutton to clothing, a pencil, a display screen of a computer, etc.

Figure 2A:
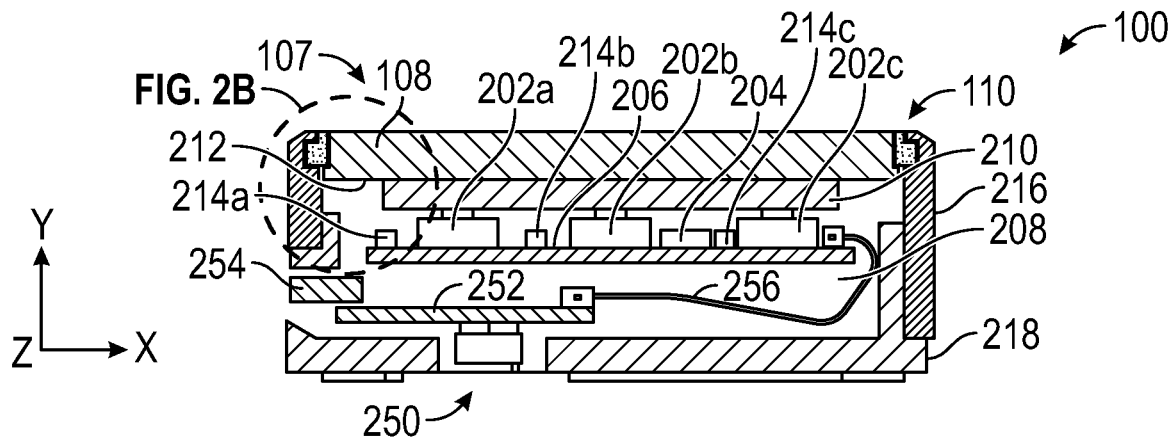
FIG. 2A is a cross sectional view of the peripheral device of FIG. 1.

FIG. 2A is a cross sectional side view of pushbutton 100. In the illustrated example pushbutton 100 includes a plurality of resiliently biased pushbutton switches 202a, 202b, 202c and a microcontroller 204 disposed on a circuit board 206 located in an interior volume 208 of the pushbutton. Pushbutton 100 also includes a plurality of light emitting elements 214a, 214b, 214c in the form of multicolor light emitting diodes (LEDs) disposed on circuit board 206 and electrically coupled to microcontroller 204. In the illustrated example, pushbutton 100 has a cylindrical shape and housing 102 includes a cylinder 216 slidably disposed over a base 218, actuator 108 has a circular shape and light guide 110 an annular shape. In other examples, the components of a pushbutton of the present disclosure may have any other shape, such as square or triangular, etc.

In the illustrated example, pushbutton switches 202 are momentary switches that temporarily open or close a circuit when depressed, which generates a signal received by microcontroller 204. Each of pushbutton switches 202 are resiliently biased to an extended position such as by an internal spring (not illustrated). The plurality of pushbutton switches 202 provide partial or complete vertical support (e.g. referring to the cartesian axes shown in FIG. 2A support in the y-direction) for actuator 108 so that actuator 108 is also resiliently biased in the vertical direction by the pushbutton switches. In the illustrated example actuator 108 includes at least one protrusion 210 located on a bottom side 212 of the actuator for coupling the actuator to the pushbutton switches 202 and for supporting the actuator above the pushbutton switches. In the illustrated example, pushbutton 100 includes three pushbutton switches 202 located in a triangular pattern on circuit board 206 for stably supporting actuator 108. In an example microcontroller 204 is programmed to generate a command signal when any one of pushbutton switches 202 is depressed and sends a corresponding signal to the microcontroller so that pushbutton 100 will send a command even when actuator 108 is pressed at an outer edge potentially resulting in an off-axis tilting of the actuator.

Figure 2B:
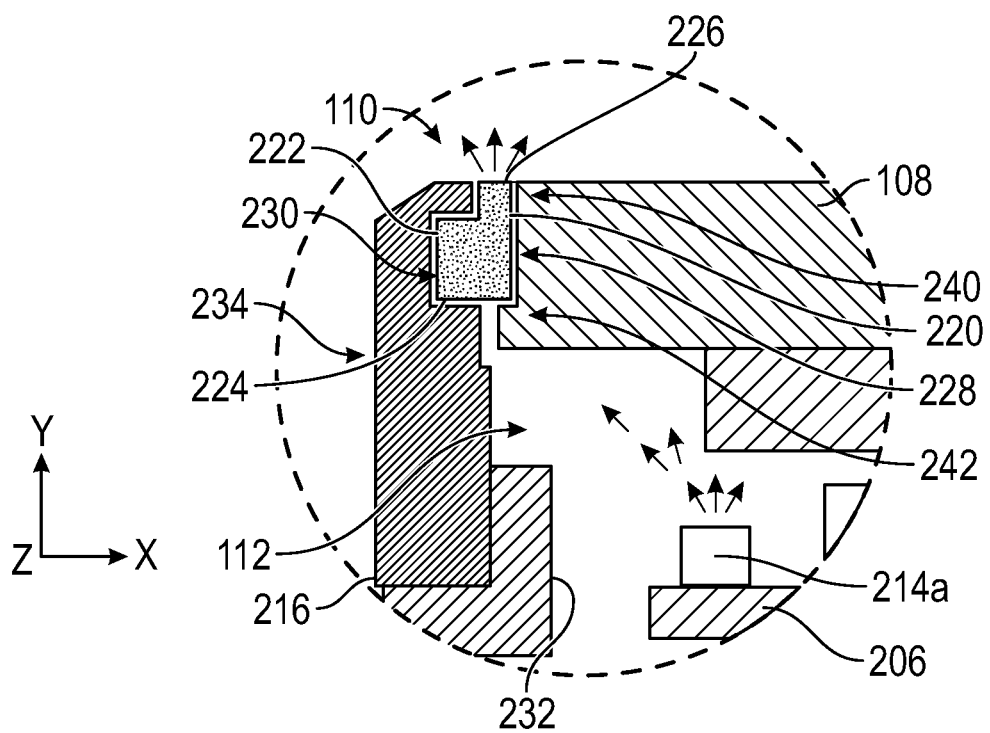
FIG. 2B is an enlarged section view of a portion of FIG. 2B.

Referring to FIG. 2B, actuator 108 is located within opening 107 by light guide 110. Light guide 110 has an annular shape defined by an inner side 220, an outer side 222, a bottom side 224, and a top side 226. Inner side 220 is designed and configured as a bearing surface and is configured to be in sliding contact with an outer side 228 of actuator 108. Light guide 110 is, therefore, designed as a bushing for locating actuator 108 within opening 107 in housing 102 and for providing for a smooth and stable sliding movement of the actuator in the y-direction. Light guide 110, in cooperation with pushbutton switches 202, is also configured to maintain actuator 108 in a substantially horizontal orientation (parallel to the x-z plane) as the actuator moves in the y-direction when it is depressed by a user.

Light guide 110 is also configured to transmit and uniformize light 112 that is emitted by light emitting elements 214 and incident on bottom side 224 and uniformly emit the light along top side 226 of the light guide for providing a control status light signal. In an example light guide is an annular element that is disposed around a portion or all of a perimeter of pushbutton 100 and uniformizes light generated from one or more light emitting elements 214 located in interior volume 208 to thereby provide a uniformly colored light indicator on an exterior of the pushbutton.

Light guide 110 is also designed to function as a key that securely couples actuator 108 to housing 102 and acts as a stop that prevents vertical movement beyond a maximum vertical location. In the illustrated example outer side 222 of light guide 110 has a complementary shape to a recess 230 located in an inner surface 232 of sidewall 234 of cylinder 216 to thereby mechanically couple the light guide to the sidewall. In other examples, other complementary shapes may be used, such as a recess in outer side 222 and a complementary protrusion in sidewall 234 or combinations thereof. Outer side 228 of actuator 108 has a recess 240 that defines a shelf 242 designed to come into contact with bottom side 224 of light guide 110 that acts as a stop. Light guide 110 is formed from materials selected according to optical and mechanical properties to provide the functions of a light guide, bushing, and mechanical stop. In an example, light guide 110 is formed from a translucent polymer, such as an acrylate polymer (acrylic) or other translucent polymer, ceramic or other material. In other examples, the functions provided by light guide may be performed by separate components. For example, a separate bushing made of a different material than the light guide may be disposed between the light guide and actuator 108.

Figure 3:
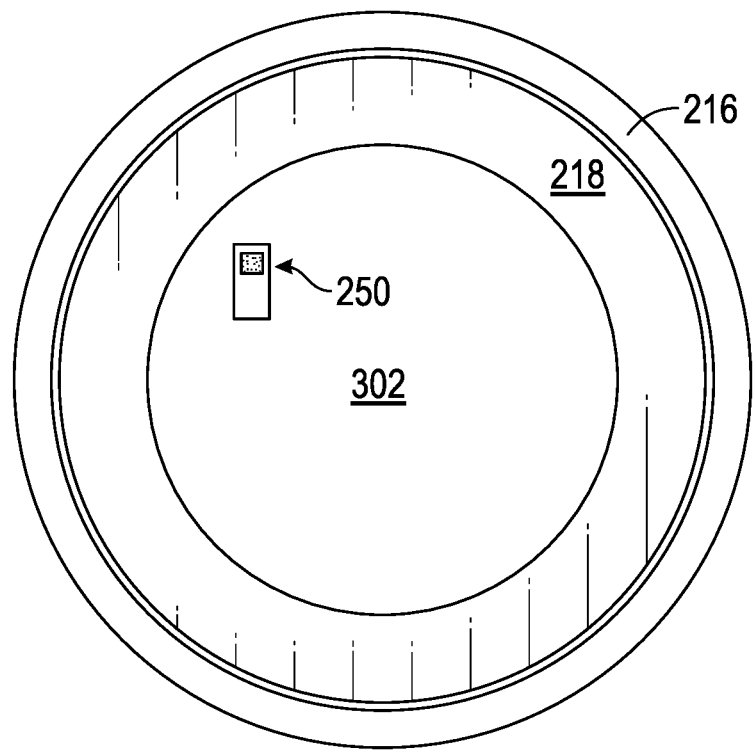
FIG. 3 is a bottom view of the peripheral device of FIGS. 1-2B.

FIG. 3 is a bottom view of pushbutton 100. Referring again to FIG. 2A as well as FIG. 3, in the illustrated example pushbutton 100 includes at least one command signal group selector switch 250 for selecting between at least two different groups of peripheral device command signals, wherein each group includes at least one peripheral device command signal. In the illustrated example pushbutton 100 includes only one command signal group selector switch 250 located on a bottom side 302 of the pushbutton and the command signal group selector switch has two positions for selecting between two different groups of commands. In other examples, peripheral devices of the present disclosure may include command signal group selector switches located in other locations on the device other than the bottom side, may include two or more command signal group selector switches, and one or more of the command signal group selector switches may include three or more positions for selecting between three or more groups of command signals. Command signal group selector switch 250 may be any type of multi-state user-selectable electronic element known in the art including any type of electromechanical switch, such as a toggle, slide, or rotary switch with two or more positions. Referring to FIG. 2A, in the illustrated example command signal group selector switch 250 is disposed on a circuit board 252. A USB connector 254 for connecting a USB cable to pushbutton 100 and a cable and connector 256 for connecting circuit boards 252 and 206 are also coupled to circuit board 252.

In an example, pushbutton 100 may be configured to be operable with two operating systems, such as Microsoft Windows and macOS, by changing a position of command signal group selector switch 250. For example, when command signal group selector switch 250 is in a first position shown in FIG. 3, microcontroller 204 may be configured to transmit at least one peripheral device command signal for an application running on a computing device with a first operating system, e.g., Microsoft Windows. And when command signal group selector switch 250 is moved to a second position, microcontroller 204 may be configured to transmit at least one peripheral device command signal for an application running on a computing device with a second operating system, e.g., macOS. By way of example, pushbutton 100 may be configured to toggle the mute control on a videoconferencing application such as Zoom® by sending a peripheral device command signal in response to a user-depression of actuator 108 that is the same as the command signal generated by a keyboard when the keyboard keys for a keyboard shortcut for the mute control on Zoom are pressed. As of the filing of the present application the keyboard shortcut in Zoom for turning mute on and off is CMD+SHIFT+A for macOS and ALT+A for Windows. Thus, in an example, when command signal group selector switch 250 is in a first position, pushbutton 100 may be configured to send a command signal that is the same as the command signal sent by a keyboard when the CMD, SHIFT, and A keys are depressed and when the command signal group selector switch is in a second position, send a command signal that is the same as the command signal sent by a keyboard when the ALT and A keys are depressed. Thus, in an example, pushbutton 100 may be configured to send a first group of peripheral device command signals that mimic keyboard shortcuts for a first group of applications running on a first operating system when command signal group selector switch 250 is in a first position and send a second group of peripheral device command signals that mimic keyboard shortcuts for the first group of software applications running on a second operating system that is different than the first operating system when command signal group selector switch is in a second position.

In other examples, pushbutton 100 may be configured to send command signals for more than one control and/or for more than one operating system. For example, pushbutton 100 may be configured to send command signals for both mute control and for video control to simultaneously turn a user's microphone and video on or off. In another example, pushbutton 100 may be configured to send command signals for one or more control functions for multiple operating systems at the same time, for example, Windows, Android, and Chrome. In an example, pushbutton 100 may be configured to send command signals for one or more control functions for multiple software applications at the same time, for example, multiple video conferencing applications, such as Zoom and MS Teams simultaneously or in close succession. In some examples, pushbutton 100 may have at least one command signal group selector switch 250 for switching between different groups of controls, for example, a mute only position, a video only position and a mute and video position so that the pushbutton toggles just mute on and off, just video on and off, or both mute and video on and off, respectively. In the foregoing examples the user may choose the position of the one or more command signal group selector switches to the designed configuration and then can simply hit the single actuator 108 to toggle the selected command(s) while an application is running, such as a videoconferencing application. Persons of ordinary skill in the art will recognize that the use of pushbutton 100 is not limited to videoconferencing applications and can be used for any application configured to receive peripheral device command signals, such as HID commands corresponding to keyboard signals or signals from any other peripheral device known in the art.

Figure 4:
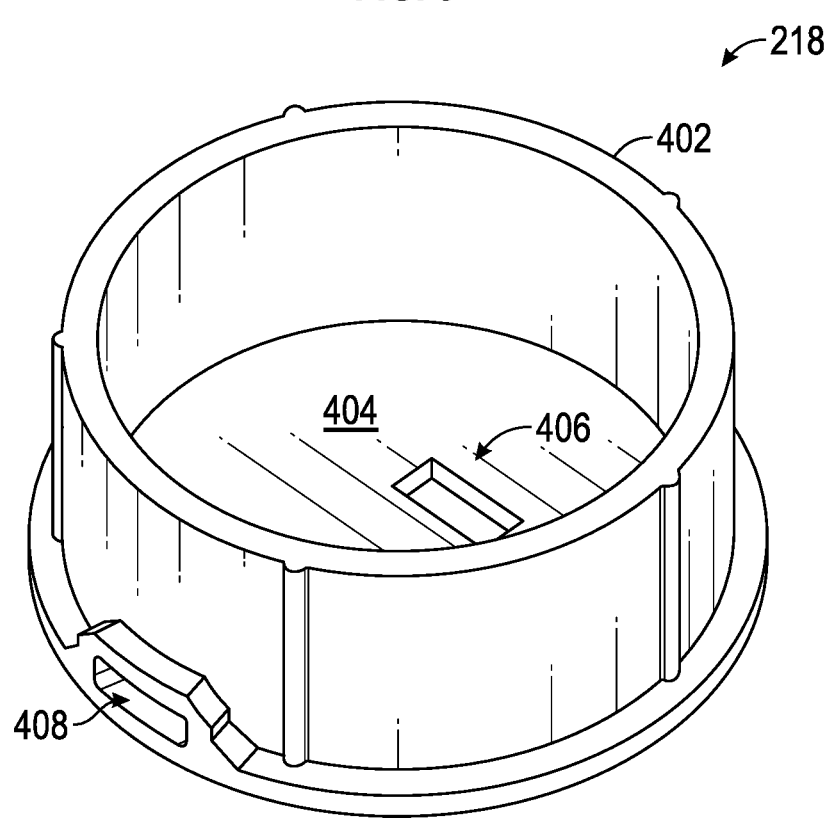
FIG. 4 is a perspective view of the base of the peripheral device of FIGS. 1-3.

FIG. 4 is a perspective view of base 218 and shows sidewall 402 that is configured and dimensioned to have an interference fit with inner surface 232 of cylinder 216. A bottom surface 404 of base 218 includes at least one opening 406 for command signal group selector switch 250 and sidewall 402 includes an opening 408 for USB connector 254.

Figure 5:
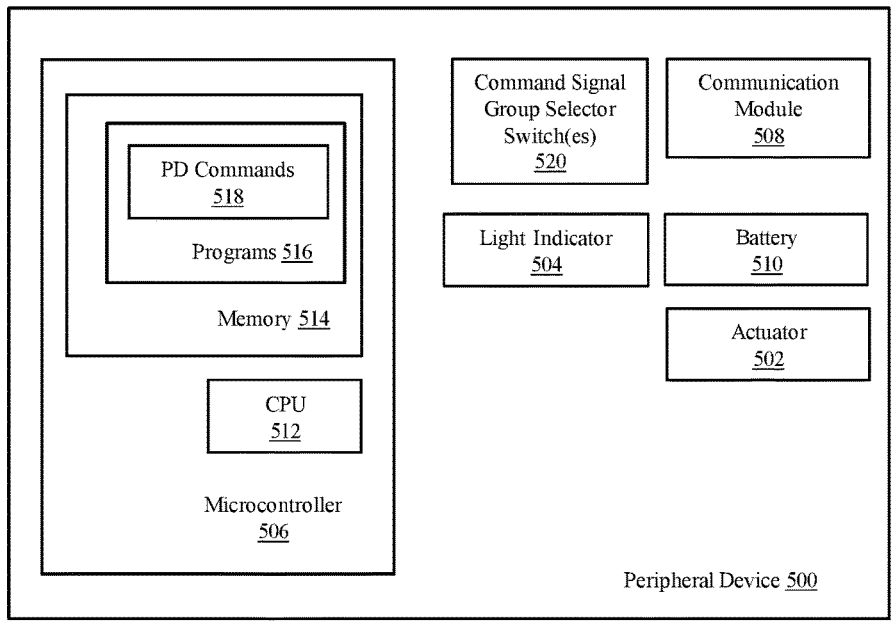
FIG. 5 is a functional block diagram of another example of a peripheral device made in accordance with the present disclosure and a computing device communicatively coupled to the peripheral device for control of a software application running on the computing device by the peripheral device.
Figure 5:
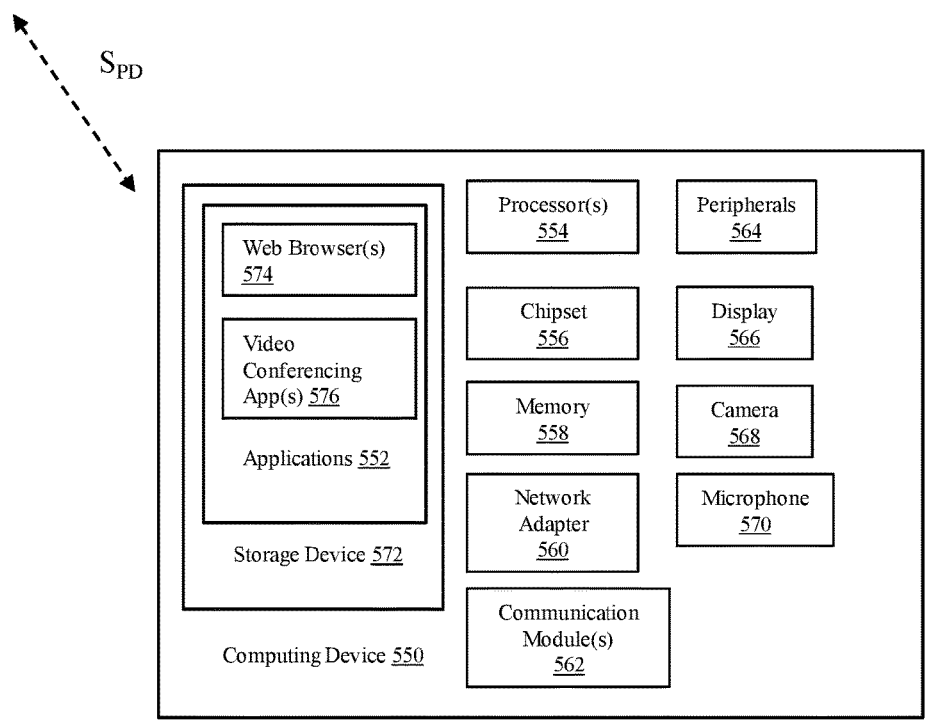

FIG. 5 is a functional block diagram of an example peripheral device 500 made in accordance with the present disclosure and a computing device 550, the peripheral device communicatively coupled to the computing device and configured to send peripheral device command signals $S_{PD}$ to the computing device for controlling one or more software applications 552 running on the computing device. Peripheral device 500 includes an actuator 502 that, when selected by a user, causes the peripheral device to send one or more peripheral device command signals, $S_{PD}$, to a computing device, such as computing device 550. Actuator 502 may have the same or similar configuration as actuator 108 (FIG. 1) or any other configuration known in the art for receiving a user-generated selection, such as buttons or switches or non-contact, such as audio, light or capacitance based sensors. As with pushbutton 100, peripheral device 500 may have a simplified design with only one actuator 502 or may have multiple actuators. Peripheral device 500 also includes a light indicator 504 for providing a control status light signal that indicates a status of a control function, such as whether a user's microphone, e.g., microphone 570, is muted or not. Light indicator 504 may include at least one light emitting element that is connected to and controlled by microcontroller 506, the microcontroller configured to change a light emitting state of the light indicator according to a status of a software control feature. Peripheral device 500 may be in wired or wireless communication with computing device 550 and may include a communication module 508 for wired or wireless communication. Communication module 508 may include a transceiver for wireless communication via one or more communication protocols such as Bluetooth, Wi-Fi, or Zigbee, etc. Peripheral device 500 may also include a battery 510 to power the components of the device.

In the illustrated example, microcontroller 506 includes a central processing unit (CPU) 512 configured to perform operations according to instructions stored in memory 514. Memory 514 may be any non-transitory computer-readable storage medium and may include one or more programs 516, which, in the illustrated example includes a peripheral device (PD) commands program 518 that includes instructions for causing microcontroller 506 to send one or more peripheral device command signals in response to a user-activation of actuator 502. Peripheral device 500 also includes at least one command signal group selector switch 520 that has two or more user-selectable positions or states for selecting between two or more groups of peripheral device command signals.

Table 1 shows, as of the time of the present application, the keyboard shortcuts for two controls, audio and video control, for toggling a computing device microphone, e.g., microphone 570, or camera, e.g., camera 568, on and off, for three popular videoconferencing applications, Zoom, Google Meet and MS Teams, for four different operating systems—macOS, Windows, Android, and Chrome. In an example, PD commands program 518 includes instructions for sending peripheral device command signals that mimic (are the same as) the peripheral device command signals for specific keyboard shortcuts, such as the keyboard shortcuts shown in Table 1. The peripheral device command signals can be signals that conform to any communication protocol known in the art. In an example, the peripheral device command signals conform to the well-known and established Human Interface Device (HID) protocol. In an example, the peripheral device command signals are designed and configured to be recognized by and operable with a computing device such as computing device 550 without the need to install custom software such as a custom driver on the computing device.

In one example command signal group selector switches 520 may include four user-selectable states for selecting between operating systems and command function groups. Specifically, command signal group selector switches 520 may include two options for operating system (OS_1 and OS_2) and two options for command function groups (FG_1 and FG_2). OS_1 may correspond to macOS and OS_2 may correspond to Windows, Chrome and Android. FG_1 may correspond to the mute toggle and FG_2 may correspond to the video toggle.

In the illustrated example, and referring to Table 1, when using an Apple device and when a user would like to toggle mute, a user would select a configuration of group selector switches 520 from a plurality of configurations that corresponds to a selection of OS_1 and FG_1. When OS_1 and FG_1 are selected, microcontroller 506 may be configured to generate command signals, such as HID commands, that correspond to the keyboard shortcuts CMD+SHIFT+A; CMD+d; and CMD+SHIFT+M. In an example, microcontroller 506 may be configured to send command signals for each key combination for each videoconferencing application in separate groups with a short, e.g., several millisecond, delay.

The other three configurations of selector switch positions shown in Table 1 may be selected for toggling video on an Apple device or toggling mute or video on a Windows, Chrome, or Android device. The four selector switch positions may be achieved with two selector switches 520 that each have two positions, or one selector switch with four positions. Selector switch 520 may be similar to selector switch 250 and located on the bottom of the device (FIG. 3) or may have another configuration. Table 1 is provided for illustrative purposes only and in other examples peripheral device 500 may have more or fewer selector switch positions and/or the selector switch positions may correspond to other groups of one or more peripheral device command signals. For example, the command function groups may include a third group for toggling both audio and video at the same time, or there may be only one command function group or only one operating system group.

TABLE 1

Keyboard Shortcuts

| Selector Switch Positions | Audio | | Video | |
|---|---|---|---|---|
| | OS_1, FG_1 MacOS | OS_2, FG_1 Windows, Chrome, Android | OS_1, FG_2 MacOS | OS_2, FG_2 Windows, Chrome, Android |
| Zoom Google Meet MS Teams | CMD + SHIFT + A CMD + D CMD + SHIFT + M | ALT + A CTRL + D CTRL + SHIFT + M | CMD + SHIFT + V CMD + E CMD + SHIFT + O | ALT + V CTRL + E CTRL + SHIFT + O |

PD commands program 518 may also include instructions for changing a state of light indicator 504 in response to a user actuation of actuator 502. In some examples, PD commands program 518 may include instructions for recording a state of a control function in memory 514, such as recording whether a mute control is on or off and control a state of light indicator 504 according to the recorded state of the control, such as changing a color of light emitted by the light indicator from green to red when mute is turned from off to on.

Peripheral device 500, therefore, may be configured to generate one or more peripheral device command signals that correspond to keyboard shortcuts in response to a user-activation of actuator 502 for controlling a software application 552 running on computing device 550. And peripheral device 500 may include one or more command signal group selector switches 520 that allows a user to configure the peripheral device in advance for a particular use case, such as for a particular operating system and/or particular group of commands. Once so configured the peripheral device 500 provides extreme simplicity and ease of use, where the predetermined peripheral device command signals are automatically transmitted in response to a user-activation of actuator 502.

Computing device 550 is illustrated by way of example and peripheral devices of the present disclosure such as pushbutton 100 and peripheral device 500 may be configured to be operable with any general purpose computing device. In the illustrated example computing device 550 include at least one processor 554 coupled to a chipset 556. Also coupled to the chipset 556 are a memory 558, a network adapter 560, and communication module(s) 562. Peripherals 564 and display 566 are coupled to the computing device 550 as well as a camera 568 and a microphone 570. In another embodiment, the memory 558 is coupled directly to the processor 554. A storage device 572 is also coupled to the chipset 556.

Storage device 572 may be any non-transitory computer-readable storage medium, such as a hard drive, compact disk read-only memory (CD-ROM), DVD, or a solid-state memory device. Storage device 572 may contain applications 552 that may be stored on storage device 572 including web browsers 574, such as Firfox, Chrome, Internet Explorer, etc. and video conferencing applications 576, such as Zoom, Google Meet, or MS Teams. In an example, command signal group selector switch(es) 520 may be positioned for peripheral device 500 to be operable with an Apple device and to toggle mute on and off. When computing device 550 is running one of video conferencing applications 576, in response to a user activation of actuator 502, peripheral device may automatically send peripheral device command signals SPD that include three separate groups of HID commands corresponding to CMD+SHIFT+A; CMD+D; and CMD+SHIFT+M that results in microphone 570 being turned on or off whether the user is using Zoom, Google Meet, or MS Teams. Peripheral device 500 may also be configured to change a state of light indicator 504, such as changing a color of light emitted by the light indicator from green to red to indicate the user's microphone is off.

Memory 558 may hold instructions and data used by the processor 554. Network adapter 560 couples the computing device 550 to a local or wide area network and communication modules 562 provide additional channels for wired or wireless communication. As is known in the art, computing device 550 can have different and/or other components than those shown in FIG. 5. In addition, computing device 550 can lack certain illustrated components.

As is known in the art, peripheral device 500 and computing device 550 are adapted to execute computer program modules for providing functionality described herein. As used herein, the term module refers to computer program logic utilized to provide the specified functionality. Thus, a module can be implemented in hardware, firmware, and/or software. In one embodiment, program modules are stored on the storage device 572, loaded into the memory 558, and executed by the processor 554.

Some portions of the present disclosure describe examples in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Figure 6:
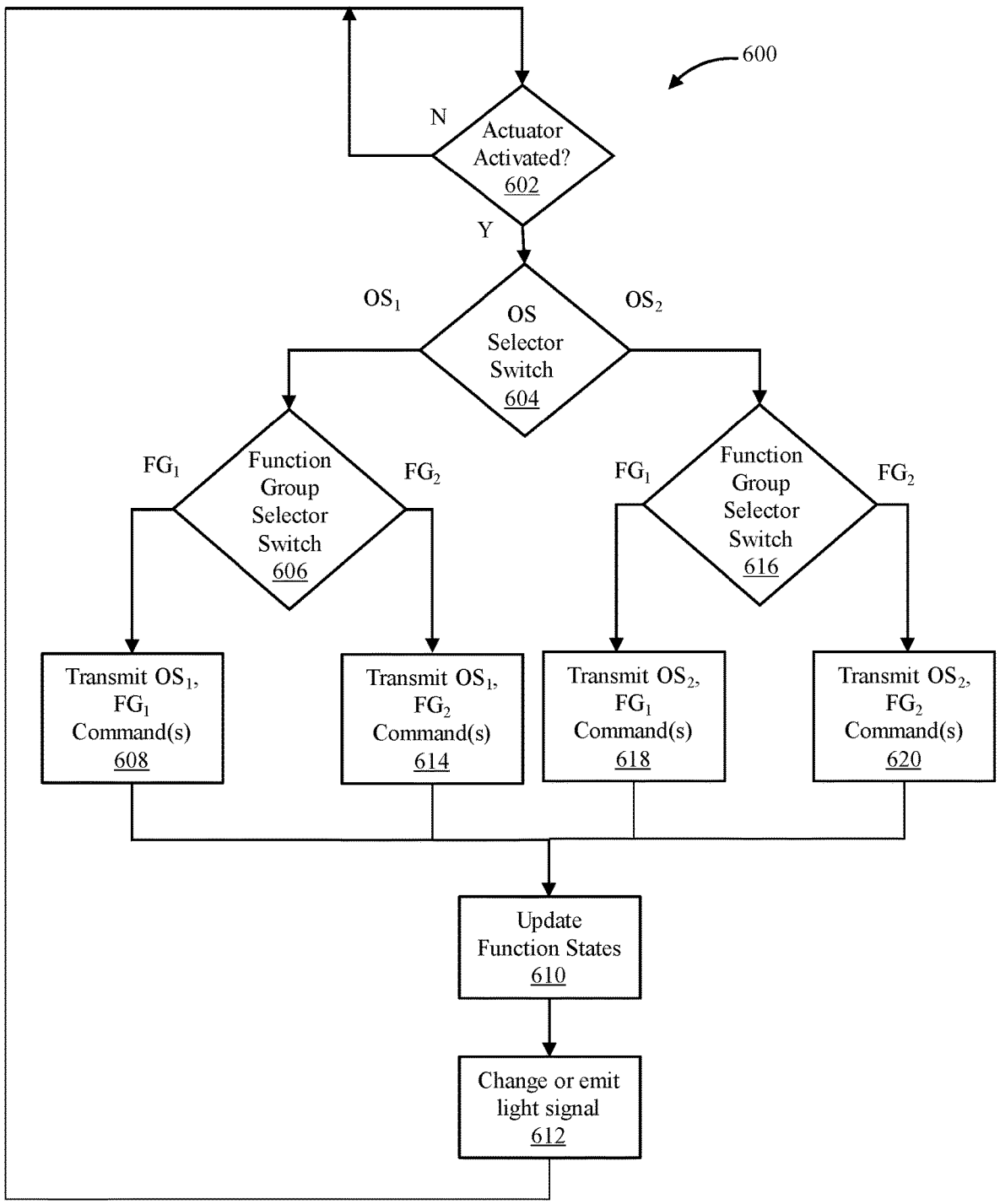
FIG. 6 is a flow chart of an example method of controlling an application, such as a videoconferencing application, with a peripheral device of the present disclosure.

FIG. 6 illustrates an example method 600 of controlling an application, such as a videoconferencing application, with a peripheral device, such as pushbutton 100 or peripheral device 500. In an example, instructions for performing method 600 may be stored in a peripheral device commands program, such as PD commands program 518 stored in memory, such as memory 514. At block 602 method 600 may include checking whether an actuator of the peripheral device, such as actuator 108 or actuator 502 was actuated, and if not repeating block 602 after some delay and if yes, at block 604, checking the state of a first command signal group selector switch, such as an operating system selector switch, for selecting between peripheral device commands for a first or second group of one or more operating systems. In response to the operating system selector switch being in a first position, OS1, at block 606, checking the state of a second command signal group selector switch, such as an function group selector switch, for selecting between peripheral device commands for a first or second group of control functions, FG1, FG2, such as between a mute control and a video control for one or more applications, and in response to determining the function group selector switch is in a first position, at block 608, generating and transmitting a first group of peripheral device command signals corresponding to the first operating system group and the first group of functions. At block 610 method 600 may include updating control function states recorded in memory, such as recording whether a microphone, such as microphone 570, is muted. At block 612, the method includes changing or emitting a light signal, such as a control status light signal emitted by light guide 110 or light indicator 504 according to the updated control function state recorded at block 610.

Returning to block 606, in response to determining the function group selector switch is in a second position, FG2, at block 614 generating and transmitting a second group of peripheral device command signals corresponding to the first operating system group OS1 and the second group of functions FG2. Returning to block 604, in response to the operating system selector switch being in a second position, OS2, at block 616 checking the state of the function group selector switch and in response to the function group selector switch being in the first position, FG1, at block 618 generating and transmitting a third group of peripheral device command signals corresponding to the second operating system group OS2 and the first group of functions FG1. Or, at block 616, in response to determining the function group selector switch is in the second position, at block 620, generating and transmitting a fourth group of peripheral device command signals corresponding to the second operating system group OS2 and the second group of functions FG2. As will be appreciated by persons having ordinary skill in the art, method 600 may be modified for peripheral devices having only one command signal group selector switch or more than two command signal group selector switches, and/or for command signal group selector switches having more than two states.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A computer peripheral device comprising:
    a housing that includes a sidewall having a top end, wherein the housing defines an interior volume and an opening at the top end;
    a microcontroller disposed in the interior volume;
    at least one light emitting element disposed in the interior volume;
    an actuator slidably disposed in the opening, the actuator having top and bottom surfaces and an outer side; and
    a bushing disposed between the sidewall and the actuator, the bushing having opposed top and bottom sides and an inner side, wherein the inner side is in sliding contact with the outer side of the actuator and provides a bearing surface for the actuator, wherein the bushing is designed and configured as a light guide that receives light incident at the bottom side emitted from the at least one light emitting element and uniformly emits the light along the top side of the bushing;
    wherein the microcontroller is configured to transmit at least one peripheral device command signal in response to a user activation of the actuator;
    wherein the outer side of the actuator includes a recess that defines a shelf that is in abutting contact with the bottom side of the bushing, the bottom side of the bushing providing a stop to prevent movement of the actuator beyond an extended position.

2. The peripheral device of claim 1, further comprising a plurality of resiliently biased pushbutton switches disposed in the interior volume and electrically connected to the microcontroller, wherein the actuator is resiliently biased in a first direction by the plurality of pushbutton switches, wherein the microcontroller is configured to transmit the at least one peripheral device command signal in response to one or more of the pushbutton switches being depressed by a movement of the actuator.

3. The peripheral device of claim 1, wherein the at least one peripheral device command signal mimics a keyboard shortcut for toggling on and off a control function of a software application running on a computing device communicatively coupled to the peripheral device.

4. The peripheral device of claim 3, wherein the light emitting element is configured to emit a control status light signal that communicates a current state of the control function.

5. The peripheral device of claim 4, wherein the peripheral device is a pushbutton, the actuator being the only actuator of the peripheral device, the actuator having a circular shape and extending across a majority of a top side of the peripheral device, the bushing having an annular shape and located around a periphery of the actuator.

6. The peripheral device of claim 3, wherein the software application is a videoconferencing application and the control function is at least one of a mute control for toggling a microphone of a computing device on and off and a video control for toggling a camera of a computing device on and off.

7. The peripheral device of claim 1, further comprising a command signal group selector switch having at least first and second positions, wherein the microcontroller is configured to transmit a first group of peripheral device command signals when the command signal group selector switch is in a first position and a second group of peripheral device command signals when the command group signal selector switch is in a second position.

8. The peripheral device of claim 7, wherein the first group of peripheral device command signals are peripheral device command signals that mimic keyboard shortcuts for a first group of applications running on a first operating system and the second group of peripheral device command signals are peripheral device command signals that mimic keyboard shortcuts for the first group of applications running on a second operating system that is different than the first operating system.

9. The peripheral device of claim 8, wherein the first and second groups of peripheral device command signals mimic keyboard shortcuts for toggling on and off a control function of the first group of applications.

10. The peripheral device of claim 9, wherein the first and second groups of peripheral device command signals are Human Interface Device (HID) command protocol signals.

11. The peripheral device of claim 7, wherein the actuator is the only actuator on the peripheral device, the command signal group selector switch being an electromechanical switch for configuring the peripheral device to be operable with a computing device operating a first or second operating system.

12. A computer peripheral device comprising:
    a microcontroller;
    an actuator coupled to the microcontroller; and at least one command signal group selector coupled to the microcontroller for receiving a user selection of one of a plurality of configurations;
wherein, in response to a user activation of the actuator, the microcontroller is configured to:
send a first peripheral device command signal in response to being in a first one of the plurality of configurations; and
send a second peripheral device command signal in response to being in a second one of the plurality of configurations;
wherein the first peripheral device command signal is designed to mimic a command signal corresponding to a keyboard shortcut for controlling a function of a software application operating on a first computer operating system and the second peripheral device command signal is designed to mimic a command signal corresponding to the keyboard shortcut for controlling the function of the software application operating on a second computer operating system that is different than the first computer operating system.

13. The computer peripheral device of claim 12, wherein each of the first and second peripheral device command signals include signals designed to mimic a plurality of command signals corresponding to a plurality of keyboard shortcuts for controlling the function for a plurality of software applications.

14. The computer peripheral device of claim 13, wherein the function is a microphone on/off control or a camera on/off control.

15. The computer peripheral device of claim 12, wherein the microcontroller is further configured to send peripheral device command signals corresponding to any one of a plurality of different functions of the software application in response to the command signal group selector being in corresponding ones of the plurality of configurations.

16. The computer peripheral device of claim 12, wherein the microcontroller is further configured to change a state of a light signal emitted from a light indicator to indicate a current state of the function of the software application.

17. The computer peripheral device of claim 12, wherein the first and second peripheral device command signals are Human Interface Device (HID) command protocol signals.

18. The computer peripheral device of claim 12, wherein the computer peripheral device includes a plurality of the at least one command signal group selector, the microcontroller configured to send peripheral device command signals according to a configuration of the plurality of the command signal group selectors.

19. A method of controlling a computer program with a computer peripheral device, the method comprising:
in response to a user activation of an actuator of the peripheral device;
sending a first peripheral device command signal in response to a user-selected configuration of at least one command signal group selector of the peripheral device being in a first one of a plurality of configurations; and
sending a second peripheral device command signal in response to a user-selected configuration of the at least one command signal group selector being in a second one of the plurality of configurations,
wherein the first peripheral device command signal is designed to mimic a command signal corresponding to a keyboard shortcut for controlling a function of a software application operating on a first computer operating system and the second peripheral device command signal is designed to mimic a command signal corresponding to the keyboard shortcut for controlling the function of the software application operating on a second computer operating system that is different than the first computer operating system.

20. The method of claim 19, wherein each of the first and second peripheral device command signals include signals designed to mimic a plurality of command signals corresponding to a plurality of keyboard shortcuts for controlling the function for a plurality of software applications.

21. The method of claim 20, wherein the function is a microphone on/off control or a camera on/off control.

22. The method of claim 19, further comprising:
sending peripheral device command signals corresponding to any one of a plurality of different functions of the software application in response to the command signal group selector being in corresponding ones of the plurality of configurations.

23. The method of claim 19, the method further comprising changing a state of a light signal emitted from a light indicator to indicate a current state of the control function of the software application.

24. The method claim 19, wherein the first and second peripheral device command signals are Human Interface Device (HID) command protocol signals.

25. A computer peripheral device comprising:
a housing that includes a sidewall having a top end, wherein the housing defines an interior volume and an opening at the top end;
a microcontroller disposed in the interior volume;
at least one light emitting element disposed in the interior volume;
an actuator slidably disposed in the opening, the actuator having top and bottom surfaces and an outer side; and
a bushing disposed between the sidewall and the actuator, the bushing having opposed top and bottom sides and an inner side, wherein the inner side is in sliding contact with the outer side of the actuator and provides a bearing surface for the actuator, wherein the bushing is designed and configured as a light guide that receives light incident at the bottom side emitted from the at least one light emitting element and uniformly emits the light along the top side of the bushing;
wherein the microcontroller is configured to transmit at least one peripheral device command signal in response to a user activation of the actuator;
wherein the at least one peripheral device command signal mimics a keyboard shortcut for toggling on and off a control function of a software application running on a computing device communicatively coupled to the peripheral device;
wherein the software application is a videoconferencing application and the control function is at least one of a mute control for toggling a microphone of a computing device on and off and a video control for toggling a camera of a computing device on and off.

26. A computer peripheral device comprising:
a housing that includes a sidewall having a top end, wherein the housing defines an interior volume and an opening at the top end;
a microcontroller disposed in the interior volume;
at least one light emitting element disposed in the interior volume;
an actuator slidably disposed in the opening, the actuator having top and bottom surfaces and an outer side; and a bushing disposed between the sidewall and the actuator, the bushing having opposed top and bottom sides and an inner side, wherein the inner side is in sliding contact with the outer side of the actuator and provides a bearing surface for the actuator, wherein the bushing is designed and configured as a light guide that receives light incident at the bottom side emitted from the at least one light emitting element and uniformly emits the light along the top side of the bushing;

wherein the microcontroller is configured to transmit at least one peripheral device command signal in response to a user activation of the actuator;

further comprising a command signal group selector having at least first and second configurations, wherein the microcontroller is configured to transmit a first peripheral device command signal when the command signal group selector is in a first configuration and a second peripheral device command signal when the command group signal selector is in a second configuration.

27. A computer peripheral device comprising:

a housing that includes a sidewall having a top end, wherein the housing defines an interior volume and an opening at the top end;

a microcontroller disposed in the interior volume;

an actuator slidably disposed in the opening; and a command signal group selector for receiving a user selection of one of a plurality of configurations, wherein the microcontroller is configured to transmit a first peripheral device command signal in response to being in a first one of the plurality of configurations and transmit a second peripheral device command signal in response to being in a second one of the plurality of configurations;

wherein the first and second peripheral device command signals toggle on and off a control function of a videoconferencing application running on a computing device communicatively coupled to the peripheral device;

wherein the control function is at least one of a mute control for toggling a microphone of the computing device on and off and a video control for toggling a camera of the computing device on and off.

\* \* \* \* \*